UNITED STATES PATENT OFFICE.

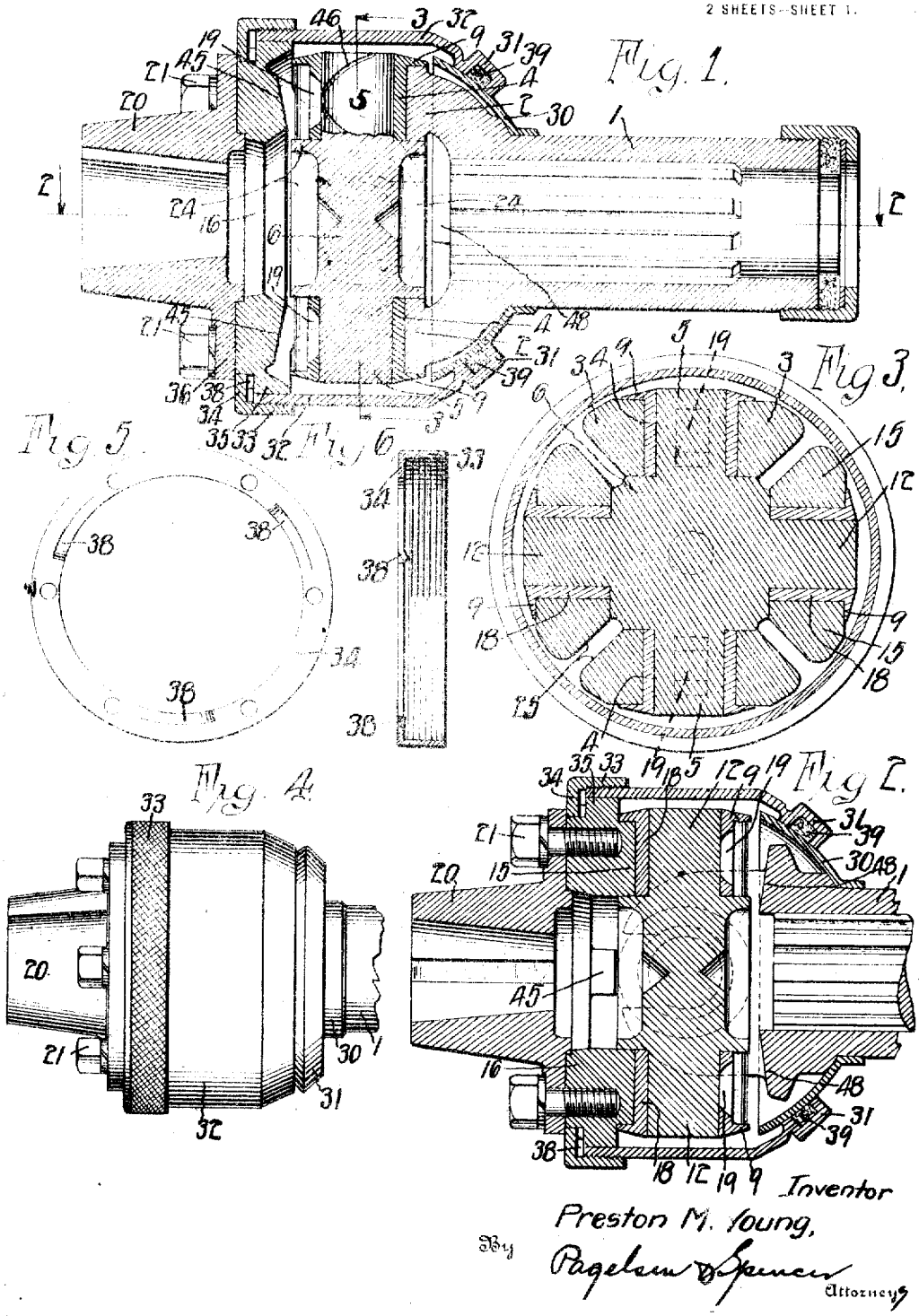

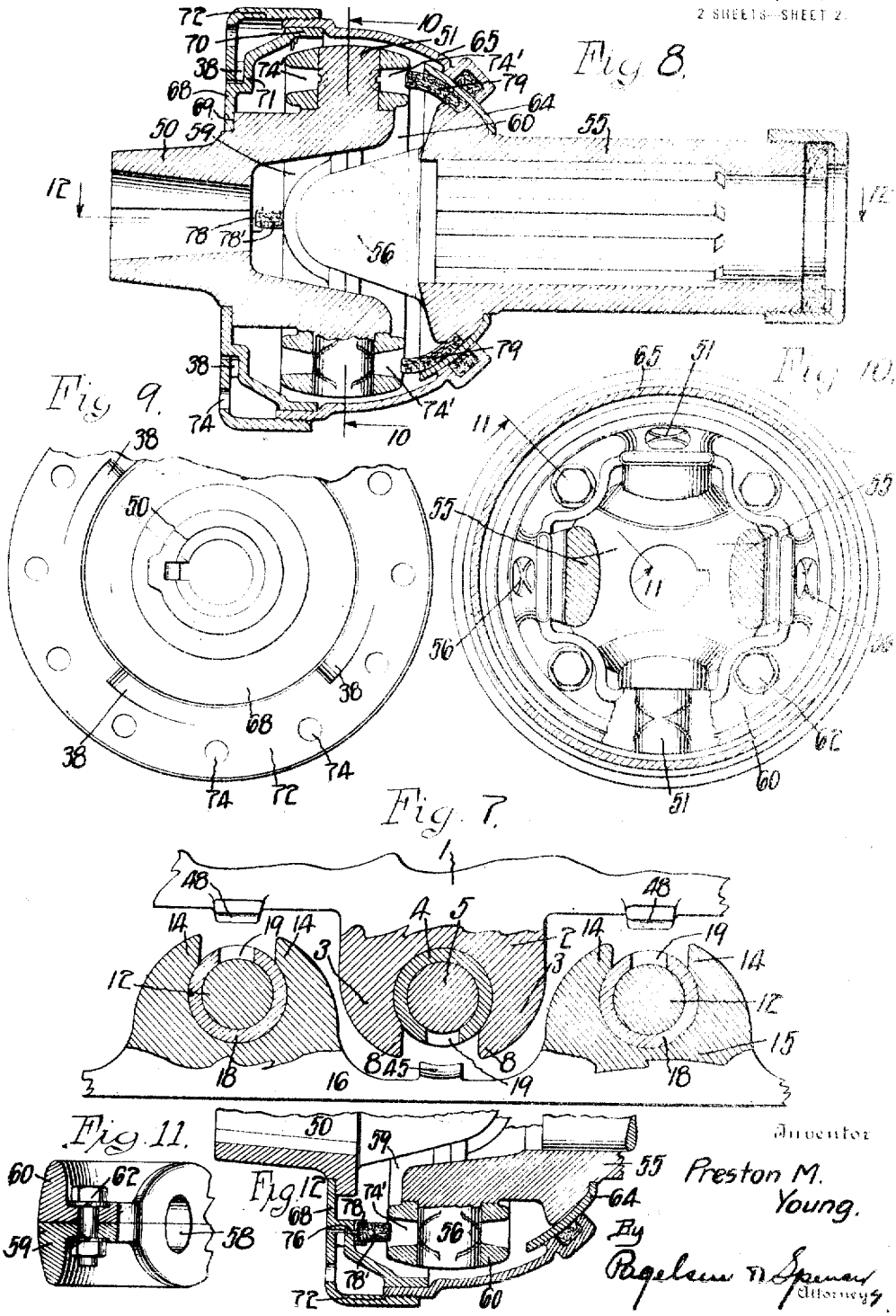

PRESTON M. YOUNG, OF UTICA, NEW YORK.

UNIVERSAL JOINT.

1,272,758.      Specification of Letters Patent.      Patented July 16, 1918.

Application filed May 31, 1917. Serial No. 171,831.

*To all whom it may concern:*

Be it known that I, PRESTON M. YOUNG, a citizen of the United States, residing at Utica, in the county of Oneida and State of New York, have invented a new and Improved Universal Joint, of which the following is a specification.

As is well known, a great deal of difficulty has been experienced in the lubrication of universal joints, particularly such joints as are adapted for use in connection with the propeller shafts of motor vehicles. The primary object of the present invention is the provision of means whereby the lubricant is positively fed to the bearing surfaces, and it consists in means whereby the oscillating movement of the connecting member about its actual or imaginary center, and in respect to the main members, is utilized to create an added pressure of oil or lubricant at the bearing surfaces; also in a joint having exposed bearing surfaces together with means whereby the relative movement of the main members and the connecting member is caused to force oil against the exposed surfaces at each rotation of the shaft; also in a universal joint having a casing whereby lubricant is prevented from being thrown off by centrifugal action, together with means for applying additional pressure to the lubricant and directing it into the bearings of the joint; also in a joint having bushings interposed between the main members and the connecting members and serving as keys to hold the members in proper operative relation to each other, said bushings being cut away to expose a portion of the bearing elements of the connecting member whereby lubricant in the casing is given free access to said bearing surfaces. The invention further consists in improvements in the casing whereby adjustment of the sections in respect to one another is readily obtained. The invention also consists in the details of construction shown, described and claimed.

In the drawings, Figure 1 is a longitudinal section showing a preferred embodiment of the invention. Fig. 2 is a similar fragmentary section on the line 2—2 of Fig. 1. Fig. 3 is a section on the line 3—3 of Fig. 1. Fig. 4 is a fragmentary side view. Fig. 5 is an end view of the tensioning nut or section of the casing. Fig. 6 is a radial section corresponding to Fig. 5. Fig. 7 is a fragmentary cylindrical development showing more clearly the relation of those parts whereby the compression of the lubricant is secured. Fig. 8 is a longitudinal section showing a modification. Fig. 9 is a fragmentary end view corresponding to Fig. 8. Fig. 10 is a section on the line 10—10 of Fig. 8. Fig. 11 is a section of the ring member on the line 11—11 of Fig. 10. Fig. 12 is a fragmentary section on the line 12—12 of Fig. 8.

*Cross type joint.*—In the preferred embodiment, the main member 1 has the spaced horns or furcations 2 having divided end portions 3 (Figs. 3 and 7) formed to receive the alined bushings 4 in which are received the bearing projections or studs 5 on the connecting member 6. As best shown in Fig. 7 the ends 8 of the portions 3 are spaced apart a distance greater than the diameter of the studs 5 and less than the external diameter of the bushings; the connecting member and the main member are assembled by a bodily movement of one relative to the other along the axis of the main member, and the bushings are afterward inserted from the ends, thus in effect forming keys whereby the separation of the parts is prevented. The bushings have flanges 9 at their outer ends whereby their movement is limited: these flanges have another function in that they constitute the outer walls of the chambers formed between the ends 8, the purpose of which will be explained later.

Projecting from the member 6 at right angles to the studs or journals 5 are similar studs 12 (Figs. 2 and 3) that, in similar manner, are retained between the spaced end portions 14 (Figs. 3 and 7) of horns 15 on one section 16 of a second main member by bushings 18. The latter are duplicates of the bushings 9; it will be seen that each is centrally slotted at 19 between the ends of the corresponding horns to expose a portion of the surface of the projections 5 or 12 as the case may be.

The second main member, in the embodiment shown, also includes the section 20 which is connected to the section 16 by cap screws 21, but the sections may be integral with one another in some cases. The first main member may also be made up of a plurality of parts instead of in one piece, as is both obvious and well known, and the same is true of the connecting member, but the latter is preferably provided with flanges 24 which contact directly with the corresponding horns and which also form the inner ends of the chambers between the end portions of the particular horn. As will be observed in Fig. 3, the adjacent surfaces 25 of adjacent horns preferably lie substantially in radial planes longitudinally of the joint.

In order to exclude dust and to prevent lubricant from being thrown off, the parts are inclosed in a suitable housing, the construction of which may vary within wide limits and yet preserve the efficient lubrication (hereinafter pointed out) of the joint. Preferably, however, the casing includes a spherically curved stamping 30 pressed or spun upon the member 1 and received within a rib 31 at the end of a substantially cylindrical element 32 upon which is threaded a nut 33 having an in-turned flange 34. The latter projects between the flanges 35 and 36 on the sections 16 and 20, respectively (the flange 35 fits closely within the element 32), and is slitted to form resilient tongues 38 that bear upon the flange 35 and draw the member 32 up against the member 30 so that a tight seal is afforded by the packing 39 with which the rib 31 is provided.

*Forced lubrication.*—Opposite the exposed surfaces of the pins 5, the section 16 has projections 45, the shape of which may vary but the general function of which is to act as pump pistons upon the lubricant located in the chamber formed between the ends 8 of the horns 2 and the flanges 9 and 24. In other words, at each revolution of the joint, the relative swinging movement which takes place between the member 16—20 and the member 6 thus compresses the oil to a considerable extent and forces it against the exposed surfaces of the pins from which it is distributed over the bearing area through the grooves 46. In like manner, the member 1 has projections 48 (Figs. 2 and 7) opposite the exposed surfaces of the pins 12. These projections may in both instances be made separate from the member by which they are carried, or made of different material or variously modified.

*Ring type joint*, (Figs. 8 to 12.)—In this case the main member 50 has alined out-turned trunnions or projections 51 and the member 55 has similar trunnions 56, both of which are received in bearings or sockets 58 between the halves 59 and 60 (Fig. 11) of the ring. As shown, the halves are of substantially L-shape in cross-section, and are connected by bolts 62—the actual construction may vary widely therefrom. The casing is quite similar to that previously described, being composed of the stampings 64 and 65 (suitably packed as before). A stamping 68 fits against a shoulder 69 on the member 50 and has the cylindrical end 70 over which the member 65 is slidable, and is itself shouldered at 71 to receive the nut 72 which is similar to the nut 33 and includes the resilient tongues 38 as before. Both the nut 33 and the nut 72 are perforated at 74 to receive a suitable wrench.

Each of the halves 59 and 60 are preferably cut away or have depressions therein opposite the trunnions 51—56 to form chambers 74' and to expose the trunnions; and the members 50 and 55 are provided with suitable pistons or the equivalent arranged to work in the chambers substantially as before. As shown, the member 68, by means of screws 76, carries channels or backing elements 78 in which are supported short felt strips 78' or the like that form the pistons proper. Similar strips 79 are mounted in sockets formed between the members 55 and 64. The operation will be readily understood without further explantion. Bushings, although not shown, might of course be used as before.

In accordance with the patent statutes, I have shown and described what I regard as the most desirable embodiments of the invention. I do not, however, wish to be limited except as indicated by the appended claims.

I claim:—

1. A universal joint comprising two main members and a connecting member, said connecting member and one of the main members having relative pivotal movements in one direction and said connecting member and the other main member having relative pivotal movements in a direction at right angles to the first named direction, and means whereby said relative movements are utilized to insure lubrication of the bearing surfaces of the joint.

2. A universal joint comprising two main members and a connecting member, said connecting member and one of the main members having relative pivotal movements in one direction and said connecting member and the other main member having relative pivotal movements in a direction at right angles to the first named direction, and means whereby the relative movement of the connecting member and one of the main members is utilized to insure lubrication of the bearing surfaces about which said relative movement takes place.

3. A universal joint comprising two main members and a connecting member constructed and arranged to form a pair of spaced alined bearing surfaces between the connecting member and one of the main members and a second pair of alined bearing surfaces between the connecting member and the other main member, the common axis of said second pair of bearing surfaces being arranged at right angles to the common axis of the first mentioned pair of bearing surfaces, and means whereby the relative movements of the members are utilized to cause a pumping action whereby the bearing surfaces are subjected to varying oil pressures at each rotation of the joint.

4. A universal joint comprising two main member and a connecting member constructed and arranged to form a pair of alined trunnions about the axes of which relative pivotal movement may take place between the connecting member and one of the main members, and also constructed and arranged to form a second pair of alined trunnions about the axes of which relative pivotal movement may take place between the connecting member and the other main member, the surfaces of one pair of the trunnions being exposed toward one end of the universal joint, the surfaces of the other pair being exposed toward the other end of the universal joint, and piston forming means for directing lubricant against said exposed surfaces as the joint rotates.

5. A universal joint comprising two main members and a connecting member constructed and arranged to form a pair of alined trunnions about the axes of which relative pivotal movement may take place between the connecting member and one of the main members, and also constructed and arranged to form a second pair of alined trunnions about the axes of which relative pivotal movement may take place between the connecting member and the other main member, the surfaces of one pair of the trunnions being exposed toward one end of the universal joint, and piston forming means directed toward said exposed surfaces for supplying lubricant to said surfaces under pressure as the joint rotates.

6. A universal joint comprising a casing, a main member having a divided end, a connecting member including alined journals received in the divided ends of the main member, bushings interposed between the journals and the main member, a second main member pivotally connected to the connecting member, said first mentioned main member and said bushings being open at the journals on the side toward said second main member, and piston forming means positioned adjacent the openings in the first mentioned main member and the bushings, said piston forming means being arranged to have relative movement toward and from said openings to compress lubricant therein against the exposed faces of the journals.

7. A universal joint comprising casing means, a main member including horns, each of the horns being furcated, a connecting member including alined journals received between the furcations, bushings interposed between the journals and the horns, a second main member pivotally connected to the connecting member, the bushings being open on the side adjacent the second main member, and piston forming means carried by the second main member alined with the openings in the bushings whereby lubricant is compressed therein as the joint rotates.

8. A universal joint comprising casing means, a main member including horns, each of the horns being furcated, a connecting member including alined journals received between the furcations, bushings interposed between the journals and the horns, a second main member pivotally connected to the connecting member, the bushings being open on the side adjacent the second main member and having flanges along their outer edges, said flanges projecting toward the second main member, said second main member including means constructed and arranged to pocket lubricant in the spaces determined by the openings in the bushings by the flanges of the bushings and by the furcations of the horns whereby forced lubrication of the journals is secured.

9. In a universal joint, a casing, a furcated horn therein, a bushing received in said horn, a journal in the bushing, said bushing having an opening between the extreme ends of the furcations, and a piston of greater width than the opening in the bushing and of less width than the distance between the extreme ends of the furcations constructed and arranged to have relative movement toward and from said opening as the joint rotates.

10. In a universal joint, a casing, a journal in said casing, a member in which said journal is received, said member having pivotal movement in respect to the journal and being shaped to expose a portion of the side of the journal, a piston carried by another part of the joint and arranged to approach closely to the exposed surface to insure positive lubrication of the bearing surface of said journal as the joint rotates.

11. In a universal joint, a pair of main members arranged to have universal movement in respect to each other, a casing element carried by one of the members, said element having a spherical surface, a second casing element carried by the second main member and arranged to inclose the end portion of the first named element, and resilient means arranged within the limits of the casing for drawing the second casing element toward the outer surface of the first named element.

12. In a universal joint, a pair of main members arranged to have universal movement in respect to each other, a casing element carried by one of the members, said element having a spherical surface, a second casing element carried by the second main member and arranged to inclose the end portion of the first named element, and resilient means associated with the end portion of the second element most remote from the first element for drawing said second element toward the outer surface of the first named element.

13. In a universal joint, a pair of main members and a connecting member, said main members being adapted to swing in respect to the connecting member about axes at right angles to each other, a spherically curved casing element carried by one of the main members, a second casing element arranged to inclose the end portion of the first named element to form a tight joint therewith, a third casing element carried by the second main member and arranged to be resiliently thrust in one direction along said member, said third element being threaded on the second element whereby relative adjustment may be secured and whereby the second element may be forced into sealing relation to the first element with a predetermined degree of pressure.

14. In a universal joint, a pair of main members and a connecting member, said main members being adapted to swing in respect to the connecting member about axes at right angles to each other, a spherically curved casing element carried by one of the main members, a second casing element arranged to inclose the end portion of the first named element to form a tight joint therewith, a third casing element adjustably connected to the second element, said third element having a flange, said second main member including two parts between which the flange on the third element is received.

15. In a universal joint, a pair of main members and a connecting member, said main members being adapted to swing in respect to the connecting member about axes at right angles to each other, a spherically curved casing element carried by one of the main members, a second casing element arranged to inclose the end portion of the first named element to form a tight joint therewith, a third casing element adjustably connected to the second element, said third element having a flange from which resilient tongues are struck, said tongues being adapted to urge the second element into sealing relation with the first casing element.

16. In a universal joint, a connecting member and two main members, one of the main members including two sections having spaced flanges between which an annular groove is formed, casing means having a flange received within said groove and having resilient tongues struck therefrom, said tongues being arranged to bear on one of the first named flanges, and other casing means associated with the first named means, said first named casing means being held in sealing relation to the second named casing means by said tongues.

PRESTON M. YOUNG.